United States Patent
Homma et al.

(10) Patent No.: US 8,106,545 B2
(45) Date of Patent: Jan. 31, 2012

(54) LINEAR ACTUATOR UNIT

(75) Inventors: Kazuto Homma, Tokyo (JP); Akihiro Unno, Tokyo (JP)

(73) Assignee: THK Co., Ltd., Tokyo (JP)

( * ) Notice: Subject to any disclaimer, the term of this patent is extended or adjusted under 35 U.S.C. 154(b) by 116 days.

(21) Appl. No.: 12/666,940

(22) PCT Filed: Jun. 16, 2008

(86) PCT No.: PCT/JP2008/060947
§ 371 (c)(1),
(2), (4) Date: Dec. 28, 2009

(87) PCT Pub. No.: WO2009/008247
PCT Pub. Date: Jan. 15, 2009

(65) Prior Publication Data
US 2010/0194210 A1  Aug. 5, 2010

(30) Foreign Application Priority Data
Jul. 9, 2007  (JP) .................................. 2007-179929

(51) Int. Cl.
*H02K 41/02* (2006.01)
*H02K 5/04* (2006.01)
(52) U.S. Cl. ............... 310/12.14; 310/12.31; 310/12.27; 310/12.21
(58) Field of Classification Search ............... 310/12.01, 310/12.14, 12.31, 12.27, 12.21, 12.22, 15, 310/12.25–12.26; 399/208
See application file for complete search history.

(56) References Cited

U.S. PATENT DOCUMENTS
2009/0146507 A1 *  6/2009  Teramachi et al. ............. 310/12

FOREIGN PATENT DOCUMENTS
| JP | 2003-259621 A | 9/2003 |
| JP | 2003278873 A * | 10/2003 |
| WO | WO 2006106697 A1 * | 10/2006 |
| WO | 2007/026673 A1 | 3/2007 |

OTHER PUBLICATIONS
International Search Report of PCT/JP2008/060947, mailing date of Aug. 19, 2008.

\* cited by examiner

*Primary Examiner* — Quyen Leung
*Assistant Examiner* — Leda Pham
(74) *Attorney, Agent, or Firm* — Westerman, Hattori, Daniels & Adrian, LLP

(57) ABSTRACT

Provided is a linear actuator unit that includes: a guide shaft formed of a magnetic body that is formed into a tubular shape while having a hollow portion therein, and has one linear opening portion formed thereon along an axial direction thereof; a slide member capable of reciprocating motion freely along the guide shaft; a magnet rod supported at both ends thereof in the hollow portion of the guide shaft; a forcer arranged on a periphery of the magnet rod in the hollow portion of the guide shaft, constitutes a linear motor together with the magnet rod, and is joined to the slide member while interposing the opening portion of the guide shaft therebetween; and a rod correction plate that is formed of a magnetic body, and juts out from the slide member forward and backward in a movement direction thereof so as to close the opening portion of the guide shaft.

3 Claims, 4 Drawing Sheets

LINEAR ACTUATOR UNIT

TECHNICAL FIELD

The present invention relates to a linear actuator unit in which a driving means is built, and a guide shaft and a slide member are movable relatively to each other in response to an input signal. In particular, the present invention relates to a linear actuator unit using a rod-type linear motor as a propelling means for the slide member.

BACKGROUND ART

A so-called rod-type linear motor is known as a type of a linear motor to be used as a propelling means in an actuator. This rod-type linear motor includes: a stick-like magnet rod in which a plurality of magnetic poles are arrayed in a longitudinal direction thereof; and a forcer that is provided with a through-hole through which the magnet rod is inserted, and which has coil members arrayed on an inner peripheral surface thereof. In this rod-type linear motor, when drive currents are passed through the coil members, propulsion force is generated for the forcer along an axial direction of the magnet rod.

The one disclosed in WO 2007/026673 A1 is known as a linear actuator unit using the rod-type linear motor. This linear actuator unit includes: a guide shaft that is formed into a tubular shape while having a hollow portion therein, and has an opening portion formed along a longitudinal direction thereof; a slide member that is assembled to the guide shaft while interposing a large number of balls therebetween, and guides the guide shaft in an axial direction thereof; a magnet rod supported at both ends thereof in the hollow portion of the guide shaft; and a forcer that is arranged in the hollow portion of the guide shaft, constitutes a linear motor together with the magnet rod, and is joined to the slide member while interposing the opening portion therebetween.

When drive currents are passed through coil members of the forcer, the forcer is propelled along the magnet rod in the axial direction in the hollow portion of the guide shaft. As a result, the slide member joined to the forcer while interposing the opening portion of the guide shaft therebetween is propelled in the axial direction on an outside of the guide shaft, and it becomes possible to move the slide member by an arbitrary amount with respect to the guide shaft in response to the passing of the drive currents.

In the conventional linear actuator unit having the above-mentioned structure, as a result that the rod-type linear motor is housed in the hollow portion of the guide shaft, the linear motor as a thrust force generation source, and the guide shaft as a linear guiding means and the slide member are integrated with one another in an extremely compact fashion, and it becomes extremely easy to handle the linear actuator unit.
Patent Document 1: WO 2007/026673 A1

DISCLOSURE OF THE INVENTION

Problem to be solved by the Invention

However, in the conventional linear actuator unit as described above, the guide shaft is formed of a magnetic body such as steel, and accordingly, magnetic suction force acts between the magnet rod and an inner wall of the guide shaft, which surrounds the hollow portion, as a result that the magnet rod is arranged in the hollow portion of the guide shaft. In addition, the magnet rod is arranged in the hollow portion of the guide shaft in a state where both ends thereof in the longitudinal direction are supported. Therefore, there has been a problem that flexure is prone to occur in the magnet rod when the magnetic suction force is unevenly distributed around the magnet rod.

In particular, because the opening portion is formed in the guide shaft for the purpose of joining the forcer to the slide member, and the magnetic suction force does not act between the magnet rod and the opening portion, the magnet rod arranged in the hollow portion of the guide shaft is prone to cause the flexure on an opposite side with the opening portion. When the overall length of the magnet rod is elongated, the magnet rod has sometimes been brought into contact with the guide shaft.

When the flexure as described above occurs in the magnet rod, motion of the forcer arranged so as to surround the magnet rod is hindered. Further, the forcer and the magnet rod are brought into contact with each other in the case where an amount of the flexure of the magnet rod is large. Consequently, there has been such an apprehension that the slide member may become incapable of motion. Besides this, even in the case where the contact between the forcer and the magnet rod is avoided, there has been an apprehension that positioning accuracy of the slide member may be decreased.

Means for Solving the Problems

The present invention has been made in consideration of the problems as described above. It is an object of the present invention to provide a linear actuator unit capable of suppressing the flexure of the magnet rod as much as possible and of obtaining smooth motion and high positioning accuracy of the slide member while achieving downsizing thereof by using the rod-type linear motor.

That is, a linear actuator unit according to the present invention includes: a guide shaft that is formed of a magnetic body, is formed into a tubular shape while having a hollow portion therein, and has one linear opening portion formed thereon along an axial direction thereof; a slide member capable of reciprocating motion freely along the guide shaft; a magnet rod that is supported at both ends thereof in the hollow portion of the guide shaft; a forcer that is arranged on a periphery of the magnet rod in the hollow portion of the guide shaft, constitutes a linear motor together with the magnet rod, and is joined to the slide member while interposing the opening portion of the guide shaft therebetween; and a rod correction plate that is formed of a magnetic body, and juts out from the slide member forward and backward in a movement direction thereof so as to close the opening portion of the guide shaft.

According to the present invention having the above-mentioned structure, both ends of the magnet rod are supported in the hollow portion of the guide shaft, and the periphery of the magnet rod is surrounded by the guide shaft except the opening portion. Accordingly, though the magnetic suction force acts between the magnet rod and the guide shaft, the magnetic suction force does not act between the opening portion and the magnet rod. Therefore, the magnet rod is prone to cause flexure in an opposite direction with the opening portion. However, the slide member that moves along the magnet rod includes the rod correction plate that is formed of the magnetic body and is provided in the front and back in the movement direction of the slide member, and the rod correction plate juts out from the slide member so as to close the opening portion of the guide shaft. Therefore, the magnetic suction force also acts between the rod correction plate and the magnet rod.

Hence, in regions where the rod correction plate juts out, the uneven distribution of the magnetic suction force on the periphery of the magnet rod is relieved, and the flexure of the magnet rod is reduced. Further, the rod correction plate juts out from the slide member forward and backward in the movement direction thereof. Accordingly, when the slide member moves along the guide shaft, regions where the flexure of the magnet rod is reduced also move together with the slide member. Therefore, in specific front and back regions in the movement direction of the slide member, the flexure of the magnet rod is always reduced. In such a way, it becomes possible to ensure the smooth motion of the slide member, and in addition, it becomes possible to enhance the positioning accuracy of the slide member with respect to the guide shaft.

BEST MODE FOR CARRYING OUT THE INVENTION

Description is made below in detail of a linear actuator unit of the present invention with reference to the accompanying drawings.

Figure 1:
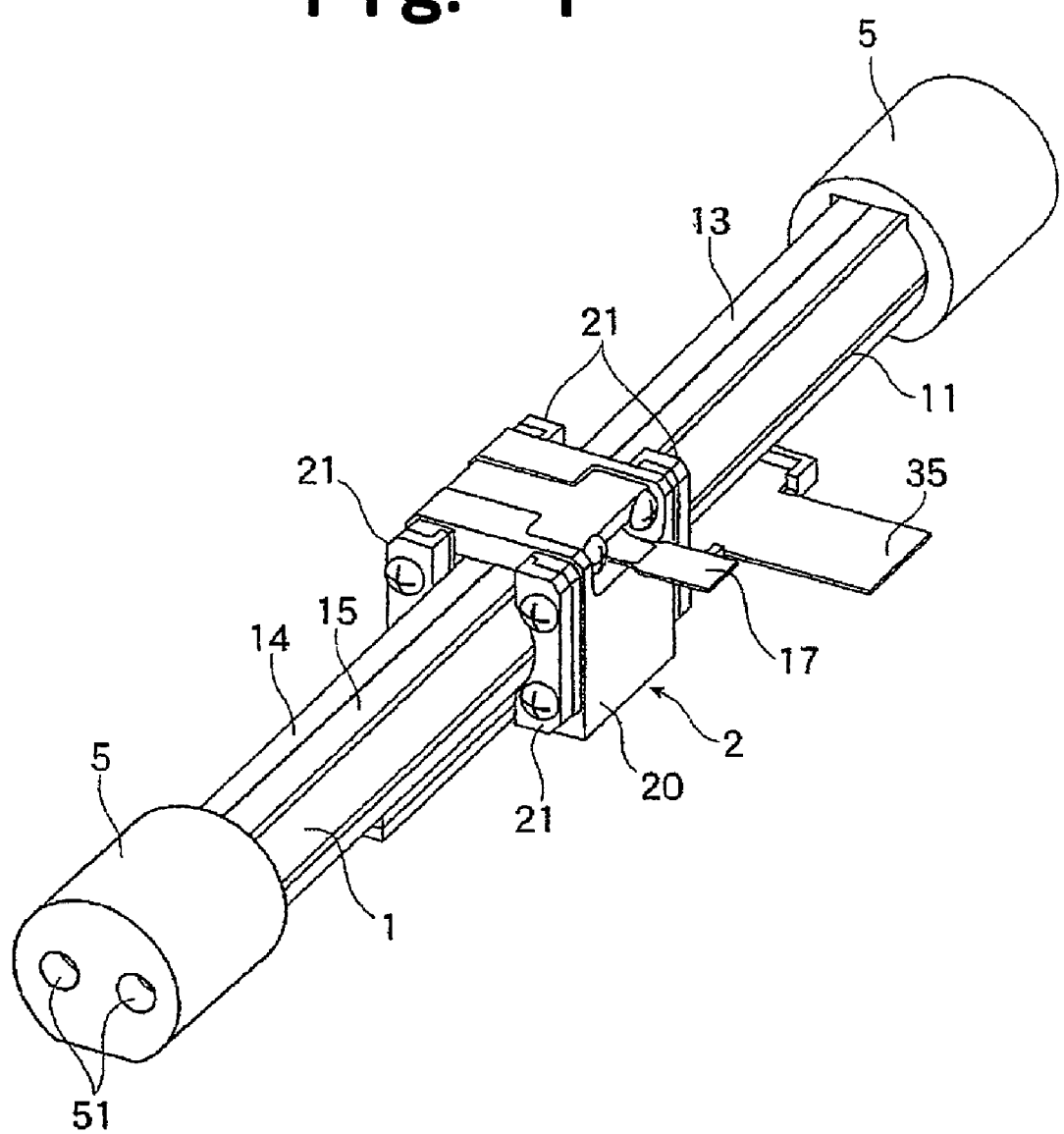
FIG. 1 is an overall perspective view illustrating a linear actuator unit of the present invention.
Figure 2:
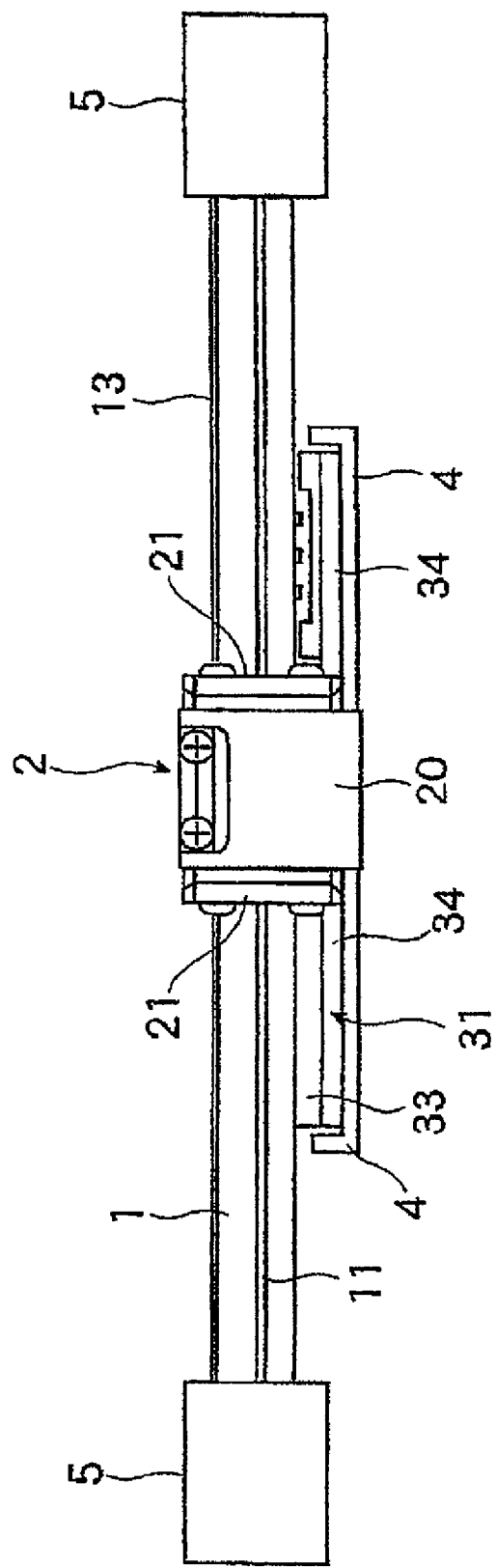
FIG. 2 is a side view of the linear actuator unit illustrated in FIG. 1.
Figure 3:
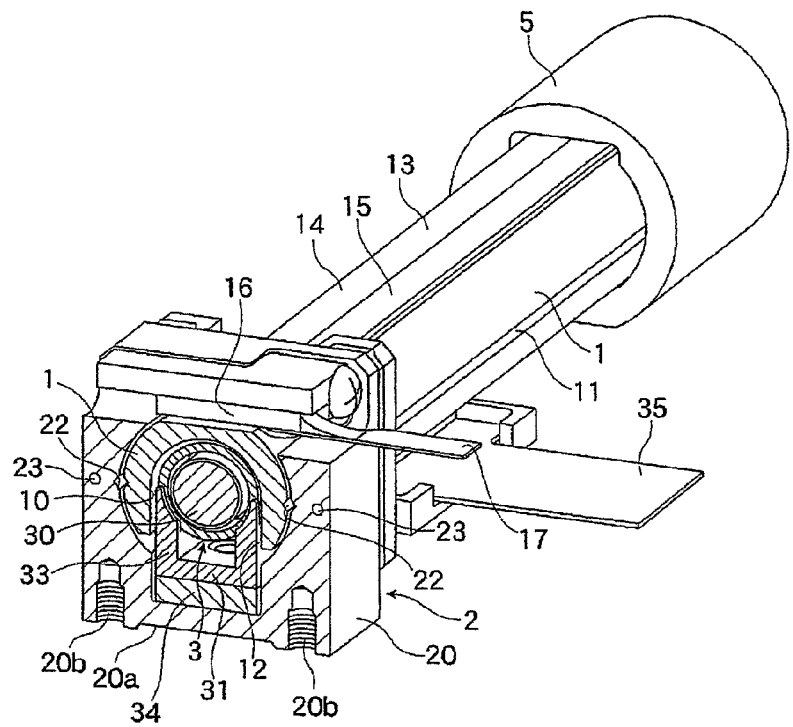
FIG. 3 is a perspective view in which a linear actuator unit illustrated in FIG. 1 is cut along a center of a slide member perpendicularly to a longitudinal direction.

FIG. 1 to FIG. 3 are views illustrating an example of the linear actuator unit to which the present invention is applied: FIG. 1 is an overall perspective view thereof; FIG. 2 is a side view thereof; and FIG. 3 is a perspective view in which the linear actuator unit is cut along a center of a slide member to be described later perpendicularly to a longitudinal direction thereof. This linear actuator unit includes: a stainless steel-made guide shaft 1 formed into a substantially cylindrical shape while having a hollow portion 10 therein; and a slide member 2 fitted to an outside of the guide shaft 1 while interposing a large number of balls therebetween. The linear actuator unit is adapted to allow the slide member 2 to perform reciprocating motion in an axial direction of the guide shaft 1 by using propulsion force generated by a linear motor 3 housed in the hollow portion 10 of the guide shaft 1.

The guide shaft 1 is formed of a magnetic body, and is formed into the cylindrical shape while having the hollow portion 10 therein. On an outer peripheral surface of the guide shaft 1, two linear ball rolling grooves 11 are formed while shifting phases thereof by 180° from each other. Further, in the guide shaft 1, one linear opening portion 12 that goes along the axial direction is provided at a position in which a phase is shifted by 90° from the ball rolling grooves 11. In FIG. 1 and FIG. 2, this opening portion is located below the guide shaft 1. Hence, the above-mentioned hollow portion 10 of the guide shaft 1 is opened to the outside of the guide shaft 1 through this opening portion 12. Further, on the outer peripheral surface of the guide shaft 1, at a position thereof shifted by 180° from the opening portion 12, a flat surface 13 is formed. This flat surface 13 serves as an attachment surface for linear scales to be described later.

Meanwhile, the slide member 2 is formed into a substantially rectangular shape, and has a through-hole having an inner diameter slightly larger than that of the guide shaft 1. The guide shaft 1 is inserted through the through-hole, and is assembled to the slide member 2 while interposing therebetween a large number of balls rolling on the ball rolling grooves 11. The slide member 2 is constituted by: a slide block 20; and a plurality of endplates 21 fixed to both end surfaces of the slide block 20 in the axial direction so as to correspond to the respective ball rolling grooves 11. On the slide block 20, an attachment surface 20a for a fixed portion or movable portion of an instrument using the linear actuator unit is formed. Tap holes 20b into which bolts are to be screwed are formed on the attachment surface 20a.

Further, on an inner peripheral surface of the through-hole of the slide block 20, two linear load rolling grooves 22 opposite to the ball rolling grooves 11 of the guide shaft 1 are formed while shifting phases thereof by 180° from each other. The balls roll between the ball rolling grooves 11 and the load rolling grooves 22 while applying loads therebetween. Further, in the slide block 20, two linear ball returning passages 23 are formed in parallel to the respective load rolling grooves 22. Those ball returning passages 23 are present on outsides of the respective load rolling grooves 22. Meanwhile, in each of the end plates 21, a direction changing passage is formed, which allows the balls to reciprocate between the load rolling groove 22 and the ball returning passage 23 corresponding thereto of the slide block 20. When two of the end plates 21 are individually fixed to both end surfaces of the slide block 20 in the axial direction, an infinite circulation passage for the balls is provided in the slide member 2. Specifically, in the slide member 2 illustrated in FIG. 3, a pair of the infinite circulation passages are formed so as to sandwich the guide shaft 1 therebetween. Note that, in FIG. 3, though the load rolling grooves 22 and the ball returning passages, which are formed on and in the slide block 20, are illustrated, the balls which roll therebetween are not illustrated.

Hence, when the slide member 2 is moved along the guide shaft 1, the balls circulate in the infinite circulation passages while applying the loads between the slide block 20 and the guide shaft 1, whereby the slide member 2 can be moved continuously along the guide shaft 1. Further, the balls roll between the ball rolling grooves 11 of the guide shaft 1 and the load rolling grooves 22 of the slide member 2. Accordingly, the slide member 2 is prevented from rotating in a circumferential direction of the guide shaft 1, whereby it becomes possible to transmit torque between the slide member 2 and the guide shaft 1. In other words, the slide member 2 and the guide shaft 1 constitute a ball spline device, the guide shaft 1 corresponds to a spline shaft, and the slide member 2 corresponds to a spline nut.

Although the slide member 2 is assembled to the outside of the guide shaft 1 in the example illustrated in FIG. 1 to FIG. 3, another configuration may also be adopted, in which the ball rolling grooves 11 are provided on an inner wall of the guide shaft 1, that is, on the inner wall of the guide shaft 1, which faces to the hollow portion 10, and the slide member 2 is assembled into the hollow portion 10 while interposing a large number of balls therebetween.

Hence, the linear actuator unit is used in such a manner that the slide member 2 is fixed to another instrument by using the tap holes 20b, and the guide shaft 1 supported by the slide member 2 is allowed to advance and retreat in the axial direction. Note that, in the actual prototype, steel balls with a diameter of 0.4 mm were used as the balls described above, whereby smooth linear reciprocating motion of the guide shaft with respect to the slide member was able to be obtained.

Meanwhile, in the hollow portion 10 of the guide shaft 1, a magnet rod 30 as a stator of the linear motor 3 is housed. The magnet rod 30 is a rod in which N-poles and S-poles of permanent magnets are alternately arrayed along the axial direction. The magnet rod 30 may be fabricated by packing an inside of a steel pipe with a large number of the permanent magnets, or alternatively, by forming magnetic poles on a round bar in such a manner that the round bar is molded and subsequently magnetized. The magnet rod 30 illustrated in FIG. 3 is fabricated in accordance with the former example.

A pair of end caps 5 are fitted to opening portions on both ends of the guide shaft 1 in the axial direction, and close the hollow portion 10 of the guide shaft 1. Holding portions which are fitted to end portions of the magnet rod 30 are individually formed in insides of those end caps 5. The pair of end caps 5 are fixed to the guide shaft 1, whereby the magnet rod 30 is held like a both end-supported beam in the hollow portion 10 of the guide shaft 1, and is positioned in parallel to the axial direction of the guide shaft 1, that is, to a movement direction of the slide member 2. Note that reference numerals 51 in the drawing denote attachment holes for set screws for fixing the end caps 5 to the guide shaft 1.

Figure 4:
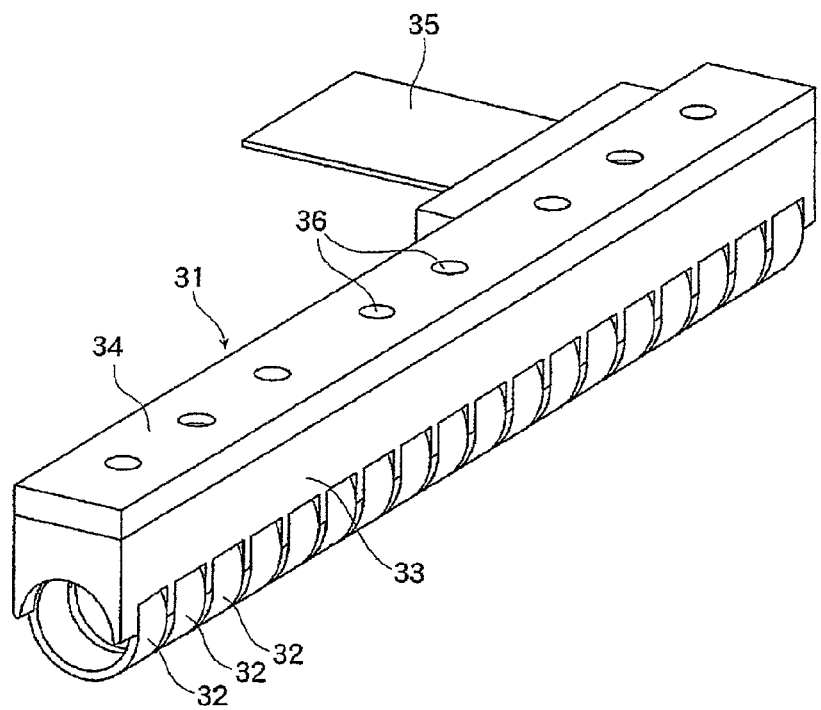
FIG. 4 is a perspective view illustrating a forcer that constitutes a linear motor.

Further, a forcer 31 constituting the linear motor 3 is arranged on a periphery of the magnet rod 30. FIG. 4 illustrates details of the forcer 31. The forcer 31 includes: a plurality of coil members 32 wound in a ring fashion around the magnet rod 30 while keeping a slight gap therewith; a resin holder 33 as an insulator that integrally holds the coil members 32; and a stainless steel-made rod correction plate 34 adhered to the resin holder 33. The rod enforcement plate 4 is formed of a magnetic body. Note that reference numeral 35 in FIG. 4 denotes a cable for passing drive currents through the respective coil members 32, and the cable 35 is formed of a flexible printed circuit board (FPC).

The respective coil members 32 are adapted to be applied with three-phase currents, and in the resin holder 33, the coil members 32 corresponding to a U-phase, V-phase and W-phase of the three-phase currents are arrayed in order. In the example illustrated in FIG. 4, eighteen coil members 32 are arrayed in the resin holder 33, and six sets of the coil members 32, each set having three coil members corresponding to the U-phase, the V-phase and the W-phase, are arrayed. Further, an array pitch of the respective coil members 32 is set shorter than an array pitch of the permanent magnets in the magnet rod 30. In the magnet rod 30, magnetic fluxes are formed from the S-magnetic poles toward the N-magnetic poles, and a magnetic pole sensor (not shown) that detects densities of the magnetic fluxes is built in the forcer 31. Hence, positional relationships of the respective magnetic poles (N-poles and S-poles) of the magnet rod 30 with respect to the coil members 32 are grasped from detection signals outputted by the magnetic pole sensor. A driver unit that controls the passing of the drive currents through the coil members 32 receives the detection signals of the magnetic pole sensor, arithmetically operates phases of the optimal drive currents corresponding to the positional relationships between the coil members 32 and the respective magnetic poles of the magnet rod 30, and passes the optimal drive currents through the respective coil members 32. As a result, suction force and repulsive force are generated between the coil members 32 and the respective magnetic poles of the permanent magnets by interactions between the drive currents flowing through the respective coil members 32 and the magnetic fluxes formed by the permanent magnets, and the forcer 31 is propelled in the axial direction of the magnet rod 30.

Onto the flat surface 13 of the guide shaft 1, which is provided on an opposite side to the opening portion 12, two linear scales 14 and 15 are attached along a longitudinal direction of the guide shaft 1. Further, on the slide member 2, a reading head 16 opposite to the linear scales 14 and 15 is mounted, and the reading head 16 is adapted to output a signal corresponding to a movement amount of the slide member 2 when the slide member 2 moves with respect to the guide shaft 1. The output signal of the reading head 16 is transmitted to the driver unit by a cable 17. This cable 17 is formed of a flexible printed circuit board (FPC). Further, the linear scale 14 as one of the pair of linear scales 14 and 15 is the one for detecting a position of the slide member 2 on the guide shaft 1, and the linear scale 15 as the other of the pair is the one for returning to an origin, which exhibits a home position of the slide member 2 on the guide shaft 1.

As illustrated in a cross-sectional view of FIG. 3, while the coil members 32 of the forcer 31 surround the magnet rod 30 in the hollow portion of the guide shaft 1, the resin holder 33 that holds the coil members 32 protrudes to the outside of the guide shaft 1 through the opening portion 12 of the guide shaft 1, and the rod correction plate 34 adhered to the resin holder 33 is joined to the slide member 2 by fixing screws. Therefore, tap holes 36 to which the fixing screws are to be screwed are formed in the rod correction plate 34. In such a way, when the forcer 31 is propelled in the axial direction of the magnet rod 30, the slide member 2 is propelled in the axial direction of the guide shaft 1.

An axial length of the forcer 31, that is, a length of the forcer 31, which is along an array direction of the coil members 32, is formed longer than an axial length of the slide member 2. This is in order to achieve augmentation of the propulsion force of the linear motor 3. Therefore, the slide member 2 is fixed to a center portion of the forcer 31 in a longitudinal direction thereof, and both ends of the forcer 31 in the longitudinal direction are exposed to the outside of the guide shaft 1 from such a slit opening portion 12 without being covered with the slide member 2.

Meanwhile, as a result that the forcer 31 is elongated to enhance the propulsion force of the linear motor 3, such an event is assumed to occur that the end portions of the forcer 31 may collide with the end cap 5 to thereby cause a breakage of the forcer 31 in the case where the slide member 2 overruns a limit stop position thereof on the guide shaft 1.

Figure 5:
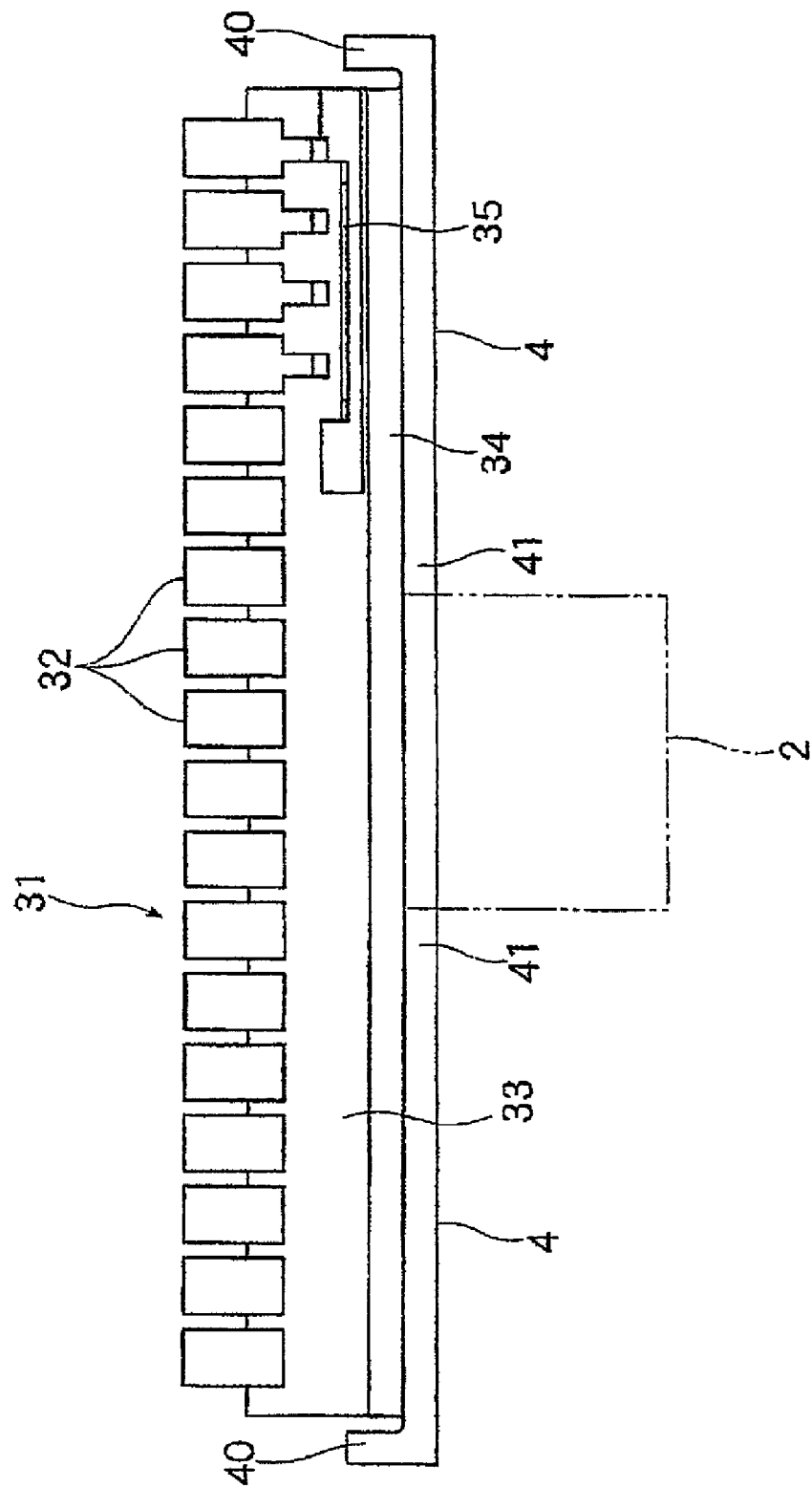
FIG. 5 is a side view illustrating a state where protector plates are mounted on the forcer illustrated in FIG. 4.

In order to prevent the breakage of the forcer 31 even in the case where such an event occurs, a pair of protector plates 4 which protect the forcer 31 are provided in the linear actuator unit. FIG. 5 is a side view illustrating the forcer 31 in a state of being mounted with the protector plates 4. The protector plates 4 are stainless steel-made plates in which tip end portions 40 are bent into a substantial L-shape. The protector plates 4 are attached to the rod correction plate 34 of the forcer 31 so as to sandwich the slide member 2 therebetween in the axial direction. In a state where the protector plates are attached to the forcer, gaps are formed between the tip end portions 40 of the protector plates 4 and end surfaces of the forcer 31 in the axial direction. Meanwhile, rear end portions 41 of the protector plates abut on the slide member 2. Further, the protector plates 4 are attached to the rod correction plate 34 of the forcer 31 with some play, whereby external force acting on the protector plates 4 is prevented from being applied to the rod correction plate 34, and eventually, to the forcer 31.

The protector plates 4 as described above are provided, whereby the protector plate 4 strikes against the end cap 5 before the forcer 31 strikes thereagainst even if the slide member 2 overruns the limit stop position when the slide member 2 is given motion along the guide shaft 1. Therefore, the forcer 31 does not strike against the end cap 5, thus making it possible to prevent the breakage of the forcer 31. Further, the gaps are present between the tip end portions 40 of the protector plates 4 and the end surfaces of the forcer 31, and in addition, such rear ends 41 of the protector plates 4 are allowed to collide with the slide member 2. Therefore, even if the protector plate 4 strikes against the end cap 5, impact force caused thereby is borne by the slide member 2 assembled to the guide shaft 1, and does not act on the forcer 31. Therefore, it becomes possible to eliminate such an adverse effect that an installation attitude and installation position of the forcer 31 with respect to the slide member 2 are changed owing to the strike of the protector plate 4 against the end cap 5.

In the linear actuator unit having the configuration as described above, the magnet rod 30 that constitutes the linear motor 3 is housed in the hollow portion 10 of the guide shaft 1 formed of a magnetic body, and in addition, the magnet rod 30 is located in the hollow portion 10 in a state where only both ends thereof are supported. Accordingly, the magnetic suction force acts between the magnet rod 30 and the guide shaft 1. However, on the guide shaft 1, the opening portion 12 is formed along the longitudinal direction, and the magnetic suction force does not act between the opening portion 12 and the magnet rod 30. Hence, such magnetic suction force is not present with respect to the circumferential direction of the guide shaft 1, but is unevenly distributed. Therefore, in the linear actuator unit having the structure illustrated in FIG. 1 to FIG. 3, the magnet rod 30 has a tendency to cause the flexure toward the opposite side of the guide shaft 1 with the opening portion 12.

However, in this linear actuator unit, the rod correction plate 34 formed of the magnetic body is mounted on the forcer 31 that juts out from the slide member 2 forward and backward in the movement direction thereof, and in addition, the forcer 31 is exposed to the outside through the opening portion 12 of the guide shaft 1. Accordingly, the rod correction plate 34 is located so as to close the opening portion 12 of the guide shaft 1. Hence, the magnetic suction force acts between the rod correction plate 34 and the magnet rod 30, which are formed of the magnetic bodies. Therefore, in regions where such rod correction plate 34 is present, that is, in regions where the forcer 31 and the magnet rod 30 overlap each other, the flexure of the magnet rod 30, which is caused by the uneven distribution of the magnetic suction force, is reduced.

Further, the rod correction plate 34 juts out from the slide member 2 forward and backward in the movement direction thereof, and moves together with such slide member 2 along the longitudinal direction of the magnet rod 30. Accordingly, the flexure of the magnet rod 30 is reduced in the front and back of a running position of the slide member 2.

In such away, in the linear actuator unit of the present invention, it becomes possible to smoothen the motion of the slide member 2 with respect to the guide shaft 1, and it becomes possible to enhance the positioning accuracy of the slide member 2 with respect to the longitudinal direction of the guide shaft 1.

Further, in the example illustrated in FIG. 2 and FIG. 5, the protector plates 4 are mounted on the rod correction plate 34, and jut out forward and backward of the slide member 2 to a large extent. Accordingly, the protector plates 4 are formed of magnetic bodies, thus also making it possible to allow such protector plates 4 to exert a function as the rod correction plate of the present invention. In this case, a thickness and length of the protector plates 4 freely detachable from the forcer 31 are arbitrarily set, thus making it possible to arbitrarily reduce a flexure amount of the magnet rod 30.

The invention claimed is:

1. A linear actuator unit, comprising:
a guide shaft that is formed of a magnetic body, is formed into a tubular shape while having a hollow portion therein, and has one linear opening portion formed thereon along an axial direction thereof;
a slide member capable of reciprocating motion freely along the guide shaft;
a magnet rod that is supported at both ends thereof in the hollow portion of the guide shaft;
a forcer that is arranged on a periphery of the magnet rod in the hollow portion of the guide shaft, constitutes a linear motor together with the magnet rod, and is joined to the slide member while interposing the opening portion of the guide shaft therebetween; and
a rod correction plate that is formed of a magnetic body, and juts out from the slide member forward and backward in a movement direction thereof so as to close the opening portion of the guide shaft.

2. A linear actuator unit according to claim 1, wherein:
the forcer has an axial length formed longer than an axial length of the slide member; and
the rod correction plate also serves as a reinforcement plate for the forcer.

3. A linear actuator unit according to claim 1, wherein:
the guide shaft comprises a spline shaft having a ball rolling groove formed along the axial direction on an outer peripheral surface thereof; and
the slide member comprises a spline nut provided so as to surround a periphery of the spline shaft while interposing a large number of balls therebetween.

* * * * *